Feb. 12, 1957  W. PECHY  2,781,118
CLUTCH MECHANISM
Filed Dec. 31, 1954  2 Sheets-Sheet 1
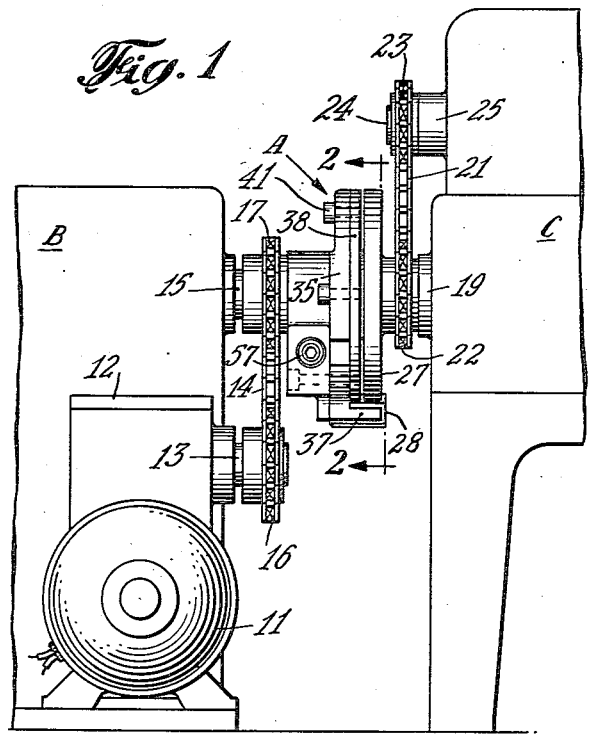
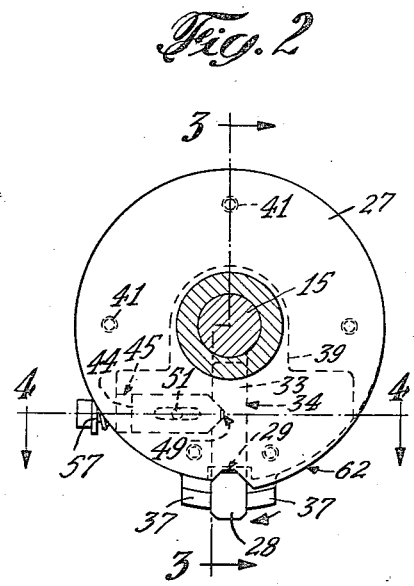
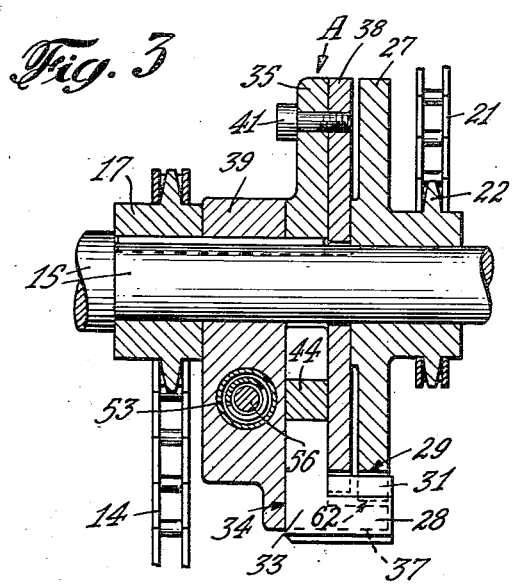
INVENTOR.
WILLIAM PECHY
BY Charles H. Erne
Leland R. McCann
George W. Reiber
ATTORNEYS

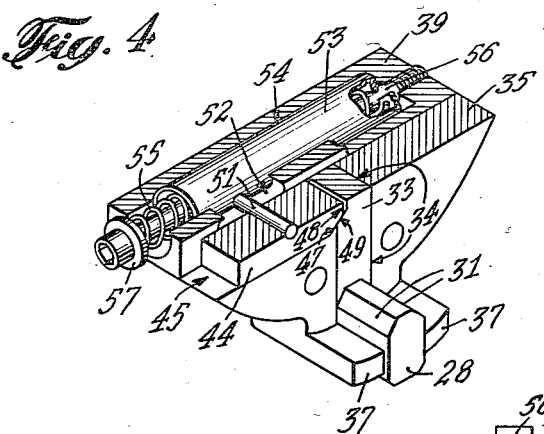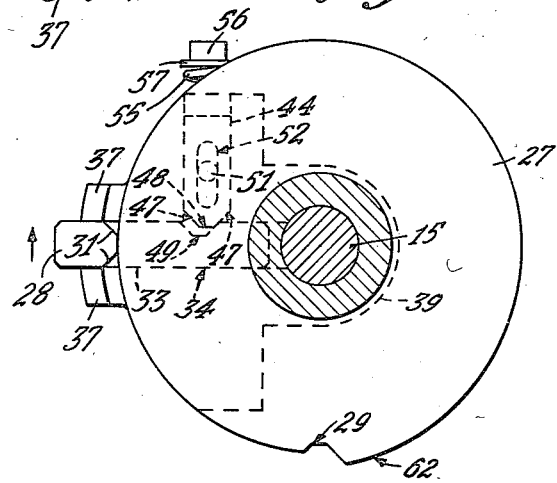

United States Patent Office 2,781,118
Patented Feb. 12, 1957

2,781,118

CLUTCH MECHANISM

William Pechy, Belmar, N. J., assignor to American Can Company, New York, N. Y., a corporation of New Jersey Application December 31, 1954, Serial No. 479,017

8 Claims. (Cl. 192—150)

The present invention relates to a machine driving clutch mechanism and has particular reference to an improved overload release clutch mechanism which automatically disengages when an overload is encountered in the machine being driven.

In the manufacture of cans or containers, container parts are passed from one machine to another or from one portion of a machine to another portion for operations performed in sequential and timed order. To effect this timed advancement of the container parts, the machines or sections of the same machine are actuated in synchronism. In order to guard against damage to the machine or machine sections when a jam occurs, an overload release clutch usually is provided in the driving mechanism to quickly release the jammed machine or section from its cooperating machine or section. Such release clutches of the mechanical type automatically reengage after each cycle or rotation with the result that when a machine in stopping overruns several cycles or revolutions of the drive shaft before finally stopping, the clutch snaps in and out of operation several times with a jolting or jarring effect.

The instant invention contemplates overcoming this difficulty by the provision of an improved overload release clutch which does not automatically re-engage.

An object of the invention is the provision of a mechanical overload release clutch which when disengaged is automatically locked against automatic re-engagement so that the driving and driven parts of the clutch remain disengaged and thereby provide for smooth, uniform operation with a minimum of wear and tear on the clutch parts.

Another object is the provision of such a clutch which is reset manually to insure against unintentional or inadvertent starting of the machine or machine section so as to protect the operator when clearing a jam or other cause of machine stoppage.

Another object is to provide such a clutch which is simple in construction and easy to maintain.

Numerous other objects and advantages of the invention will be apparent as it is better understood from the following description, which, taken in connection with the accompanying drawings, discloses a preferred embodiment thereof.

Referring to the drawings:

Figure 1 is a fragmentary elevation of a pair of machines connected by a driving mechanism including the overload release clutch embodying the instant invention;

Fig. 2 is an enlarged sectional view of the clutch mechanism taken substantially along the line 2—2 in Fig. 1;

Fig. 3 is an enlarged sectional view taken substantially along the line 3—3 in Fig. 2, with parts broken away;

Fig. 4 is an enlarged sectional perspective view taken substantially along a plane indicated by the line 4—4 in Fig. 2, with parts omitted; and Figs. 5 and 6 are views similar to Fig. 2 and illustrating the operation of the clutch mechanism, Fig. 6 including a wiring diagram of electrical apparatus used in one of the machines shown in Fig. 1;

As a preferred or exemplary embodiment of the instant invention the drawings disclose an overload release clutch mechanism A (Fig. 1) connecting a driving machine B with a driven machine C. The driving machine B preferably is actuated by a conventional electric motor 11 which transmits power through a conventional speed reduction unit 12 to a shaft 13 connected by an endless chain 14 to a main driving shaft 15. The chain 14 operates over sprockets 16, 17 mounted on the shafts 13, 15 respectively.

The main drive shaft 15 preferably extends from the machine B, where it is journaled in suitable bearing in the machine, to the machine C where it is journaled in a bearing 19 formed in machine C. The machine C is driven from the main shaft 15, through the clutch mechanism A, by an endless chain 21 which operates over a sprocket 22 mounted for free rotation on the main shaft 15 and over a sprocket 23 secured to a driving shaft 24 for driving the machine C.

The clutch A primarily comprises a driven plate or disc 27 (Figs. 2 and 3) and a driving member or dog 28 which normally is engaged in a shallow notch 29 formed in the outer circumferential edge of the driven plate 27. The driven plate 27 is loosely mounted on the main drive shaft 15 and is connected to the sprocket 22, preferably being formed integral therewith for driving the machine C through rotation of the plate 27.

The driving dog 28 rotates continuously with the main driving shaft 15 through connection therewith and is also movable radially of the shaft for displacement from the notch 29 in the driven plate 27 to disconnect the plate from the driving shaft 15 when a jam occurs in the machine C. For this purpose the driving dog 28 preferably is formed with beveled faces 31 (see Fig. 4) and the notch 29 is similarly shaped to fit the dog.

The driving dog 28 is formed on the outer end of a radial shank 33 (Figs. 2, 3, 4 and 5) which is disposed in a radial slideway 34 formed in a disc member 35 which surounds and is keyed to the main driving shaft 15 for rotation therewith. At its outer edge adjacent the driving dog 28, the disc member 35 is provided with a pair of spaced and parallel lugs 37 which project laterally from the disc member 35 on opposite sides of the driving dog to guide the latter. The shank 33 of the dog 28 is confined in its slideway 34 against lateral displacement, by a cover plate 38 on one side and a bell shaped hub 39 on the opposite side. Screws 41 (Figs. 1 and 3) secure disc members 35 and cover plate 38 together as a unitary structure. The hub 39 like the disc member 35, is keyed to the main driving shaft 15 to provide for unitary rotation of the elements 35, 38, 39 and dog shank 33 with the shaft.

The driving dog 28 is normally hold in driving engagement with the driven plate notch 29 by a spring pressed latch or plunger 44 (Figs. 2, 3 and 4) which operates in a slideway 45 formed in the disc member 35. The slideway 45 is disposed preferably at right angles to the shank slideway 34 and opens into or communicates with the shank slideway intermediate the ends of the latter as best shown in Fig. 2. Adjacent the shank slideway 34 the terminal end of the plunger 44 is formed with a latch nose having beveled faces 47 and a flat connecting face 48 (Figs. 4 and 5) which normally engages as shown in Figs. 2 and 4, in a similarly shaped notch 49 formed in the adjacent edge of the dog shank 33.

The latch plunger 44 is continuously urged toward the driving dog shank 33 by a pin 51 (Fig. 4) which is secured in the plunger and which projects laterally therefrom through an elongated slot 52 formed in the hub 39 in parallelism with the plunger slideway 45. Beyond the slot 52, the pin 51 is engaged in a spring barrel 53 which is slideably disposed in a bore 54 in the hub 39. The bore 54 is parallel with the slot 52 and plunger slideway 45.

The spring barrel 53 contains a compression spring 55 which at one end engages against a closed end of the barrel and at its opposite end projects out of an open end of the barrel. The spring surrounds a long stud 56 which extends through the barrel 53 longitudinally thereof and is secured in the hub 39 adjacent the closed end of the barrel for slideably supporting the barrel and the spring. The end of the spring adjacent the open end of the barrel engages against a head 57 formed on the stud to compress the spring against the closed end of the barrel and thus urge it and the pin 51 and plunger 44 connected thereto, toward the driving dog shank 33 to keep the nose of the plunger in engagement with the notch 49 in the shank 33.

During normal operation, the latch plunger 44 locks the driving dog shank 33 in place against radial movement and thus maintains the driving dog 28 in driving engagement with the peripheral notch 29 in the driving plate 27. The driven plate 27 and the attached sprocket 22 thus drive the driving shaft 24 of the machine C from the main driving shaft 15 of the machine B.

When a jam occurs in machine C to cause stoppage of the machine, the driven plate 27 of the clutch A tends to stop rotating with the result that the driving dog 28 being rotated by machine B, snaps out of the notch 29 in the plate 27 and rotates around the outer periphery of the plate as shown in Fig. 5. This displacement of the driving dog 28 from the notch 29 shifts its shank 33 radially outward (see Fig. 5) and thereby displaces the nose of the latch plunger 44 from the notch 49 in the shank 33, the plunger being pushed back against the resistance of the spring barrel 53.

The notches 29, 49 are purposely made shallow and with tapered or beveled sides as hereinbefore described to facilitate displacement of the driving dog 28 and plunger 44 under strains of a predetermined order so as to protect the machines against damage when a jam occurs. In order to insure full displacement of the plunger 44 from the shank notch 49 so as to prevent return of the driving dog 28 into the driving notch 29, the outer periphery of the driven plate 27 is formed with an outwardly extending spiral cam section 62 (Figs. 2, 3, 5 and 6) which pushes the shank 33 further outwardly as the driving dog 28 rides over this section of the plate as shown in Fig. 6.

This additional outward movement of the driving dog shank 33 completely removes the shank notch 49 from the plunger 44 and thus causes the flat face 48 of the plunger nose to press against the edge of the shank (see Fig. 6) and thereby hold the shank in its outermost extended position. In this held position of the shank 33 the driving dog 28 upon the completion of one single revolution of the dog around the driven plate 27 is disposed in a position outwardly remote from the driving notch 29 in the driven plate and thereby is prevented from re-engagement with the notch.

Hence upon any retarding action or complete stoppage of the driven plate 27 of the clutch, the displacement of the driving dog 28 permits the continued operation of the machine B without cyclic re-engagement of the driven plate 27 and thereby prevents sudden jolts effective on the plate and the machine C driven thereby.

In order to re-establish driving connection between the machine B and machine C, it is necessary to align the driving dog 28 with the notch 29 in the driven plate 27 and to push the dog manually into engagement with the notch. This is best accomplished when the machine B is idle and is jogged through a cycle of operation. Re-engagement of the dog with the notch besides re-establishing a driving connection between the machines also insures that the machines are in proper synchronism. When the dog 28 is thus re-engaged in the driving notch 29, the dog shank 33 is in its normal inward position and the plunger 44 is re-engaged with the shank notch 49 to yieldably lock the shank and its driving dog 28 in driving position.

Where the two machines B, C operate in synchronized order on the work passing through them, the displacement of the driving dog 28 by stoppage of machine C is often utilized to stop the operation of the driving machine B so that the work will be prevented from passing on to the idle machine C. For this purpose an electric stop switch 64 (Fig. 6) is disposed in the path of travel of the displaced driving dog 28 to control the operation of the machine B.

As an example of such a control device, Fig. 6 of the drawings shows the electric stop switch 64 as being normally closed and being connected into a closed electric control circuit which includes the electric motor 11 of machine B, a suitable source of electric current such as a generator 65 and a starting switch 66. Electric current from the generator 65 normally flows along a wire 68 to the motor 11, a connecting wire 69 to a solenoid 71 of a closed relay 72, a connecting wire 73 to and through the closed control switch 64, wires 74, 75 to and through the closed relay 72 and wires 76, 77 returning to the generator 65. Current flowing along this circuit energizes the solenoid 71 and keeps the relay 72 closed to maintain the circuit closed and the machine motor 11 in operation.

When the driving dog 28 is displaced as above described its path of travel is such that near the end of a single rotation it engages and momentarily opens the electric switch 64. Opening of this switch 64 immediately breaks the circuit and deenergizes the solenoid 71. The motor 11 and machine B thereupon ceases operation. A spring 78 attached to the relay 72 opens the relay upon de-energization of the solenoid 71 and thereby prevents re-establishment of the circuit until required.

Re-establishment of the circuit may be effected through momentary closing of the normally open start switch 66. When this switch is closed and the control switch 64 is closed, current from the generator 65 is by-passed around the relay 72 by way of wires 81, 82 which connect the closed start switch 66 with the wires 74 and 77 respectively. Thus the momentary closing of the start switch 66 closes the circuit and results in re-energization of the solenoid 71 and hence reclosing of the relay 72 to continue full operation of the motor 11 and machine B initially effected by momentary closing of the start switch 66.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An overload release clutch mechanism, comprising a rotatable drive shaft having a driving member fixed thereon and a driven member freely rotatable relative thereto, a driving dog slidably carried by one of said members and having a shank portion slidable radially relative to said shaft, the outer end of said dog having a cam surface releasably engageable with a cooperating cam surface on the other of said members for driving said driven member with said shaft, pressure means carried by said one member and engaging said shank portion for normally yieldably holding said dog in said driving engagement, said cooperating cam surfaces being operative by retarded rotation of said driven member due to an overload to bodily displace said dog radially outwardly from said other member to discontinue said driving engagement while maintaining said pressure means yieldably engaged with said shank to hold said dog in non-driving relation to said driven member.

2. A clutch mechanism of the character defined in claim 1 wherein said driven member is provided with means for engaging said driving dog when displaced for removing said dog to a remote position relative to said driven member to insure against cyclic re-engagement of said driving dog with said driven member.

3. A clutch mechanism as defined in claim 1, wherein said driving dog and pressure means are carried by and movable on said driving member and said driven member comprises a rotatable disc, said outer dog end projecting laterally from said dog shank in substantial parallelism to said shaft and releasably engaging a tapered notch in the periphery of said disc.

4. A clutch mechanism of the character defined in claim 3 wherein said rotatable driven member disc is provided with a spiral cam section engageable by said driving dog when displaced from said notch to remove said driving dog remotely from said disc to insure against cyclic re-engagement of said driving dog with said disc notch.

5. A clutch mechanism of the character defined in claim 1 wherein said driving dog shank is mounted in a radially disposed slideway carried by said driving member and wherein said pressure means is carried by said driving member and operable against said dog shank for yieldably retaining the outer end of said dog in said driving engagement and in said displaced relation to said driven member.

6. A clutch mechanism of the character defined in claim 1 wherein said pressure means is a plunger carried in said driving member and connected with a spring barrel for yieldably pressing said plunger into a notch in said driving dog shank for retaining said dog in driving engagement with said driven member, said plunger being displaceable from said notch and engageable with said dog shank beyond said notch upon displacement of said dog from said driven member to hold dog in its displaced non-driving position.

7. A clutch mechanism of the character defined in claim 6 wherein said driven member comprises a rotatable disc disposed adjacent said driving member and provided with a circumferential notch in which said driving dog engages for driving said disc, and wherein said disc is provided with a peripheral cam portion engageable with said driving dog when displaced from said disc notch to insure complete displacement of said plunger from said dog shank notch to insure against cyclic re-engagement of said driving dog with said disc notch.

8. A clutch mechanism of the character defined in claim 1, wherein means are provided for driving said shaft and means are connected with said shaft driving means and engageable by said driving dog when displaced radially outwardly for stopping said shaft driving means.

References Cited in the file of this patent

UNITED STATES PATENTS

| | | |
|---|---|---|
| 1,548,427 | Aldeen | Aug. 4, 1925 |
| 1,705,047 | Ermold | Mar. 12, 1929 |
| 2,045,572 | Dow | June 30, 1936 |
| 2,256,871 | Nelson | Sept. 23, 1941 |
| 2,425,736 | Hall | Aug. 19, 1947 |